United States Patent
Goldfarb et al.

[11] 3,902,042
[45] Aug. 26, 1975

[54] ELECTRICALLY HEATED TOOL FOR CUTTING DESIGNS IN A SURFACE

[75] Inventors: Adolph E. Goldfarb, Tarzana; Erwin Benkoe, Encino; Ronald F. Chesley, La Crescenta; Delmar K. Everitt, Woodland Hills; Richard D. Frierdich, Canoga Park, all of Calif.

[73] Assignees: Adolph E. Goldfarb; Erwin Benkoe, Northridge, Calif.

[22] Filed: Aug. 15, 1973

[21] Appl. No.: 388,574

Related U.S. Application Data

[63] Continuation-in-part of Ser. No. 334,444, Feb. 21, 1973, abandoned.

[52] U.S. Cl. .................. 219/233; 30/140; 30/286; 83/170; 144/134 D; 219/533
[51] Int. Cl. .................. H05b 1/00; B26d 7/10
[58] Field of Search .................. 219/221, 227–241, 219/533; 83/3, 5, 16, 170, 171, 520; 408/202; 144/136 C, 134 D; 30/140, 280, 276, 286, 264, 278, 282, 289, 294

[56] References Cited
UNITED STATES PATENTS

| | | | |
|---|---|---|---|
| 1,401,821 | 12/1921 | Silverman | 30/140 |
| 1,447,059 | 2/1923 | Benson | 219/229 UX |
| 1,611,381 | 12/1926 | Salsbury | 144/134 D |
| 2,097,811 | 11/1937 | Foley | 30/140 |
| 2,120,598 | 6/1938 | Beouy | 219/233 |
| 2,310,844 | 2/1943 | Draeger | 219/233 X |
| 2,573,487 | 10/1951 | Potvin | 30/280 X |
| 2,627,657 | 2/1953 | Etchen | 30/286 X |
| 3,211,039 | 10/1965 | Sheetz | 83/520 |
| 3,555,950 | 1/1971 | Gijsbers et al. | 83/171 |
| 3,762,452 | 10/1973 | Bernald | 144/134 D |

Primary Examiner—A. Bartis
Attorney, Agent, or Firm—Robert M. Ashen, Esq.

[57] ABSTRACT

A design-making device for smoothly and easily cutting or carving designs, figures or the like in a workpiece made of a meltable material such as styrofoam. The device comprises a handle, a heatable cutting element, and means for heating the element. The device also includes positioning means on the device that are adapted to engage the surface of the workpiece to be cut so as to position the cutting element relative to the workpiece surface and maintain it in that relative position while the design is cut in the workpiece, and regardless of variations in downward pressure on the device. Since good visibility of the workpiece surface is important to permit rapid and accurate movement of the device, at least a portion of the positioning means is made transparent. The positioning means also preferably permits selectively varying the position of the cutting element relative to the workpiece surface to vary the depth of cut and permit multidepth carving of the workpiece.

5 Claims, 6 Drawing Figures

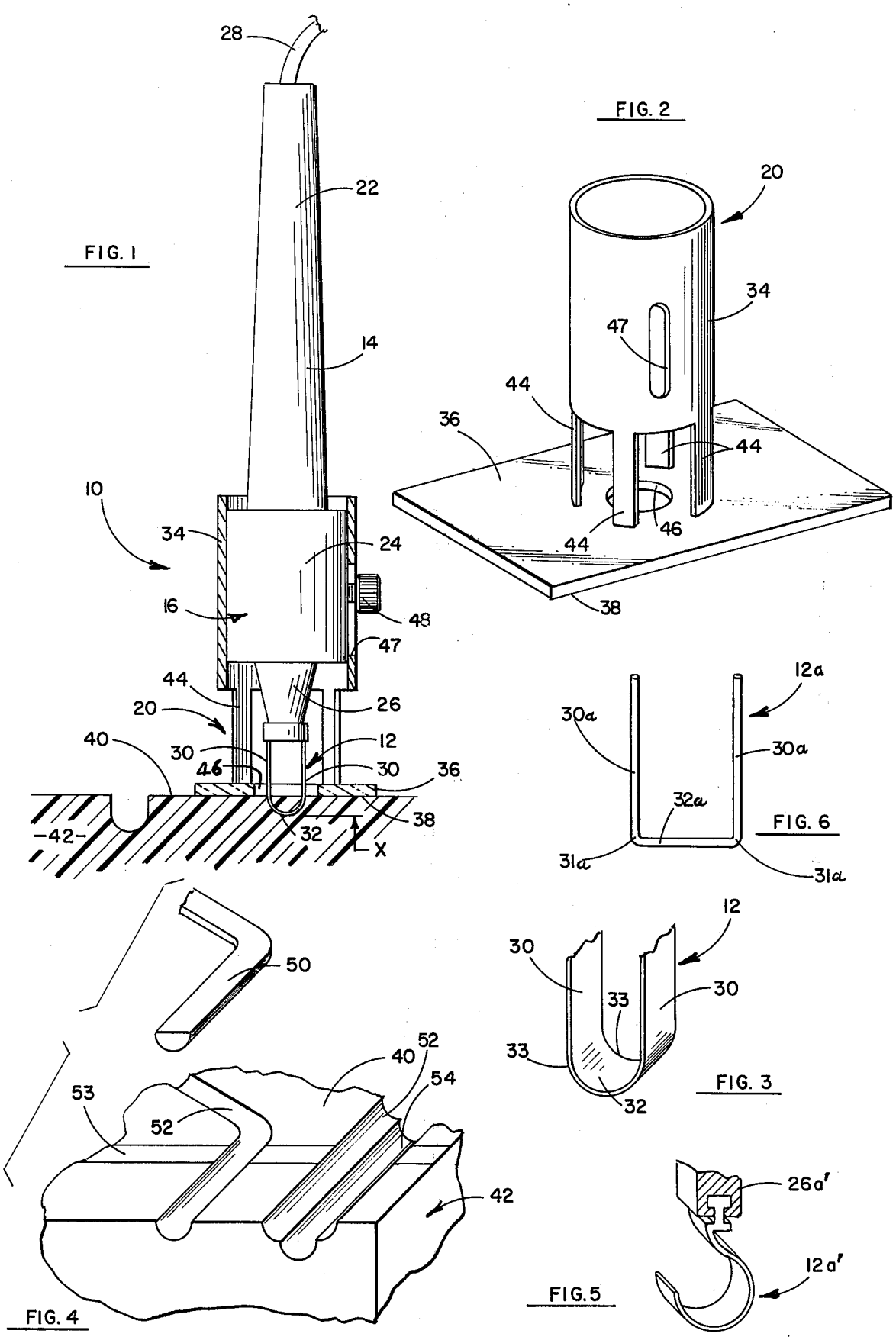

3,902,042

ELECTRICALLY HEATED TOOL FOR CUTTING DESIGNS IN A SURFACE

This application is a continuation-in-part of U.S. application Ser. No. 334,444 filed Feb. 21, 1973 now abandoned.

The use of a soldering-iron type implement to burn letters or designs into the surface of a piece of wood has been known for many years. However, such devices would not function well for a readily meltable material such as styrofoam. In other words, it would be very difficult to control the melting accomplished with such an implement because of the very limited resistance offered by the styrofoam material itself. Therefore, resulting lettering and designs would tend to be uncontrolled, to vary greatly in depth, and to even go right through the styrofoam material to the opposite side. Further, the user's attention is diverted from the design or pattern being cut to the matter of trying to maintain a desired depth of cut. This would generally frustrate the child or other user of the device. Further, there is a severe limitation on the fineness or detail which can be accomplished because of the large blunt configuration of the tip on such a device. Good visibility of the workpiece surface is very important for several reasons. First of all, it permits the user to see the design he is creating as he is creating it. It is desirable that he be able to see a fairly large area which includes not only where he is going to cut but where he has already cut. Further, it is desired that the device be moved rapidly to provide a clean, sharp, accurate cut. If the device is allowed to remain in one place too long, the area surrounding the cut will be overheated and melted, to the detriment of the design.

Still further, it is often desirable to provide visual guide indicia such as preprinted lines on the workpiece surface to facilitate producing a specific design. For such guide indicia to be used effectively, it is necessary that the user be able to maintain good eye contact with the indicia as the device is moved along those lines. Normal support means tend to block the view of the user and to thereby create difficulties. This is particularly so when intricate or complicated designs are involved which require the device to be moved in various different directions.

Mechanical devices and toys for cutting styrofoam and the like, such as small reciprocating saws, cut very slowly, produce a fallout of chips or cuttings which create an undesirable mess, and provde sharp edges or points which make them dangerous to the users, especially younger children.

The present invention contemplates the utilization of a design maker in the form of a thermal cutter for styrofoam or the like, which comprises a heatable cutting element, a handle for holding the element, and means for causing the element to become heated. In one aspect, the heatable element may include a cutting portion having a thin cutting edge which permits a thin, clean and controlled thermal cut to be made in the work material. The presently preferred cutting portion is in the form of a thin blade, however, it may take other forms such as a wire. In another aspect, positioning or guide means are provided to locate the cutting element depth relative to the workpiece while the cutting is accomplished. This is an important feature as it permits easy, smooth movement of the device over the surface of the workpiece without concern about maintaining the depth of cut. The guide means are at least in part transparent to facilitate viewing the workpiece as the design is being cut. The device can thereby virtually glide over the workpiece. This positioning means may be adjustable to vary the depth of the cutting element relative to the piece being cut to provide the desired depth of cut and to permit multi-depth cutting or carving of a design.

In the drawings:

FIG. 1 is a side view, partially in section, of a design making device in the form of a thermal cutter which embodies a preferred form of the present invention;

FIG. 2 is a perspective view of positioning means of the device of FIG. 1;

FIG. 3 is an enlarged fragmentary view of a portion of the cutting element of the device;

FIG. 4 shows a styrofoam workpiece from which a section has been cut by the device;

FIGS. 5 and 6 show alternate forms of cutting elements.

A presently preferred embodiment of the invention is illustrated as cutting device 10 in FIGS. 1 through 3. In general, the cutting device 10 comprises a thermal cutting element 12, a handle 14 which supports the cutting element, and means 16 for heating the cutting element. The illustrated device also includes positioning or guide means 20 adjustably mounted on the handle.

The handle 14 may take any desired convenient shape. The illustrated handle 14 is elongated in the general form of a conventional soldering iron and has a longitudinal axis. It has a rear gripping portion 22, a cylindrical midportion 24, and a forward portion 26 which holds the heatable cutting element. The heatable cutting element 12 is mounted at the front end of the forward portion 26 in a fixed position extending outwardly from the end. The element 12 may be detachable so that elements of other size and configuration, or other characteristics, may be substituted. The handle may be constructed of metal, wood, plastic, or other material, just so that it is suitably insulated from the electrical components contained therein. The electrical components which provide electrical energy to heat the cutting element may be of conventional type known in the art. For example, the cutting element might be physically or mechanically connected to another heatable unit, with the heat being transmitted to the cutting element by conduction through the material of the other element. Alternately, electrical current may be caused to flow directly through the heating element to heat the element, but this approach is generally undesirable for a child's toy. Electrical power may be provided to the device by an external plug-in cord of conventional type as shown at 28, or by batteries or power cells mounted in the handle itself. Typically, the heating element will be heated to a temperature of about 300°F to produce a good, clean cut.

The illustrated heatable cutting element 12 comprises a thin band of metallic material such as steel, which is preferably coated with "teflon" to prevent globs of melted plastic forming on the band. The band is formed into a generally U-shaped, curved configuration that has a pair of outwardly extended leg portions 30 which connect to the handle and extend outwardly therefrom, and a curved central portion 32 connected to the outer ends of the leg portions. The leg portions 30 extend generally parallel to the axis of the handle 14. The illustrated band has a pair of thin opposed edges 33 which provide cutting edges for the device.

Either edge 33 may be used as the leading cutting edge. FIG. 6 shows an alternative form of element 12a comprised of a thin wire formed into a curved U-shape where the central portion 32a is generally straight and is connected to the leg portions 30a by small-radius corner portions 31a. The drawings illustrate the utilization of this configuration thermal cutting element 12, to make a cut of like configuration in a block or sheet of material such as styrofoam.

To support, position and guide the cutting element relative to the workpiece, the positioning or guide means 20 is provided. In broad terms, the positioning means 20 rest atop the workpiece and establish and maintain the depth of cut of the cutting element into the workpiece as the device travels over the workpiece to cut the desired design. The device thus slides over the workpiece with the cutting element extending into the workpiece a selected depth regardless of the downward pressure on the device. The user is thus free to concentrate on making his design or carving. Portions of the means 20 are transparent to permit the user to see the workpiece as the design is being cut.

The illustrated means 20 comprises a tubular sleeve portion 34 which receives the cylindrical midportion 24 of the handle therethrough. The positioning means also includes a transparent plate portion 36 which has a forwardly-facing, flat, generally smooth, workpiece-engaging surface 38 adapted to rest upon and move easily over the top surface 40 of a workpiece 42 (FIG. 1). The plate portion 36 is connected to the tubular portion 34 by three or four connecting strips or struts 44. The plate portion 36 has a central aperture 46 disposed in alignment with the opening through the tubular portion 34 so that the cutting element 12 can extend through that aperture, to engage and cut the workpiece. The plate portion 36 is generally perpendicular to the leg portions 30 of the cutting element. As shown in FIG. 1, with the plate portion 36 disposed on top of the workpiece, the cutting element 12 cuts into the workpiece and thereby extends below the top surface 40 and into the workpiece a determinable amount "X". It is possible that different lengths of cutting elements may be utilized, and as mentioned above, the cutting element may be detachable for ready replacement. In the illustrated device 10, the adjustment of "X" is achieved by adjusting the position of the handle relative to that of the tubular holding portion. Thus, the depth of cut into the workpiece may be changed to whatever depth is desired by the user. Multidepth carving may be done on the same workpiece to create a variety of effects and designs.

The adjustment feature is provided as follows: The cylindrical mid-portion 24 of the handle is received in the tubular portion 34 of the positioning means for longitudinal sliding movement. This serves to position the cutting element 12 relative to the workpiece engaging surface 38 of the plate portion, and thus relative to the workpiece itself. There is a longitudinally extending slot 47 in the tubular portion 34 and a thumb screw 48 extends through the slot 47 and threads into the side of the mid-portion 24 of the handle to releasibly lock the handle relative to the positioning means.

The illustrated adjustment means is simple and economical, however, other means for accomplishing this purpose may be provided, alternatively, if desired. For example, the cutting element could be adjustably mounted to vary the dimension X, or the element could be replaceably mounted with different size cutting elements being utilized. FIG. 5 shows a simple arrangement where a somewhat modified cutting element 12a' is replaceably mounted as, for example, by means of a snap fit in the end 26a' of the handle.

FIG. 4 shows a workpiece 42 in which a design 52 has been cut by the illustrated device. As described above, the surface 38 is pressed down against the top surface 40 of the workpiece and the device may be slid about in a smooth, easy, gliding manner over the workpiece surface, cutting the design into the workpiece as it proceeds. The depth of cut is set as described above. FIG. 4 also shows a second design 54 cut in the workpiece to a different depth than design 52. The designs 52 and 54 may combine to provide a desired carved contour or configuration to the surface of the workpiece.

Because of the U-shaped closed-loop configuration of the cutting element, a segment 50 is cut free from the remainder of the workpiece. The segment 50 has the cross section of the cutting element and the shape of the design or writing effected by the movement of the device. The cut segment 50 itself can be adhered as by adhesive to the surface of the workpiece at another location to provide a raised configuration, or it may be secured to a piece of paper or other object. Obviously, letters or numbers can be cut as well as any design or configuration which the user may desire. The design, etc., can be free-hand, it can follow a model or instruction illustration, or it may be printed on the surface 40 of the workpiece as shown, for example, at 53 in FIG. 4.

As discussed above, it is important that the user have good visibility of the workpiece as he performs the cutting. This not only permits him to see where he has been and where he is going, but it aids him in moving more rapidly to avoid excess peripheral melting of the workpiece. Further, the use of preprinted designs or other guiding indicia on the workpiece surface comprises an important practical application of the device, particularly for younger children and where it is desired to provide material to produce a specific design object. To provide such visibility, the plate portion 36 is desirably made of a transparent material such as glass or clear plastic.

The device may be provided with an on-off switch and/or a heat control (not shown) to control the operation and temperature of the cutting element. In general, a satisfactory temperature for cutting styrofoam or like material may be determined by the manufacturer so that the device may be plugged in when it is desired to use it and unplugged when it is not used. This, of course, achieves simplicity and economy in the manufacture and fabrication of the device.

It will be appreciated that the operation of the device is quite simple. It is placed adjacent the edge of the workpiece to be cut with the cutting element disposed adjacent the edge of the workpiece and with the workpiece engaging surface in engagement with the upper surface of the workpiece. Then with the cutting element at cutting temperature, the user merely slides the entire device over the surface of the workpiece, keeping the engaging surface riding firmly upon the upper surface of the workpiece and manipulating the direction of the movement to achieve the desired configuration of cut. Since the depth of cut is set and automatically maintained, all the user's effort can go into the design itself and the depth of cut will be maintained regardless of downward pressure exerted by the user.

The cutting may also be started from a place within the boundaries of the workpiece rather than at an edge by preferably tilting the tool somewhat to permit the cutting element to approach the top surface of the workpiece at somewhat of an incline and cut its way down to its operation depth as indicated by X. The cutting of a particular letter of configuration may then proceed as noted above. The cutting element may then be removed from the workpiece by lifting up on the device while somewhat inclining the handle so that the cutting element will cut its way back to the surface of the workpiece and thereby effect disengagement between the cutting device and workpiece.

Thus, interesting and varied designs, pictures, writing, etc., can be created.

We claim:

1. A device for forming designs in a workpiece of foam plastic material having a work surface comprising:
   a readily heatable, relatively thin, generally U-shaped cutting element,
   said cutting element having a pair of spaced apart legs connected by a bight portion and presenting a pair of opposed cutting edges,
   a support for supporting said cutting element with a portion of the cutting element engaging said workpiece and with the legs of said element extending generally normal to the work surface of the workpiece,
   means operatively associated with said cutting element for heating said element to a temperature sufficient for at least partially melting the portions of the foam plastic material contacted thereby,
   adjustment means operatively associated with said support and said cutting element for variably setting the depth of penetration of said element below the work surface of said workpiece,
   releasable locking means for retaining said cutting element at the depth of penetration set by said adjustment means,
   a relatively transparent plate member operatively attached to said support and extending generally normal to said cutting element legs for providing a workpiece engaging surface in juxtaposition to and adapted to move easily over said workpiece surface, said plate member having an aperture therein through which the cutting element extends, and
   a handle attached to said support and extending generally parallel with said legs for use in manually sliding said plate member over the surface of the workpiece whereby said cutting element cuts an incision from said workpiece in accordance with the movement of said plate member.

2. The device of claim 1 wherein said plate member is generally flat and is provided with a pair of opposed relatively flat surfaces.

3. The device of claim 1 wherein said heating means causes heating of the cutting element to about 300°F.

4. A thermal cutting device for cutting designs and the like in a foam plastic workpiece, said device comprising:
   a cylindrically shaped housing portion,
   a handle operatively connected to the rearward end of said housing portion and extending rearwardly therefrom to be engaged by the hand of an operator of the device.
   a tubular section disposed within said housing portion,
   a forwardly extending element secured to said tubular section and extending forwardly from said cylindrically shaped housing portion,
   a heatable cutting element including a cutting portion secured to the forward end of said forwardly extending element having a pair of opposed cutting edges designed to cut through meltable foam plastic material,
   said heatable cutting element being formed of a relatively thin band of electrically conductive metallic material having sufficient resistivity characteristics to be heated by electrical energy,
   said cylindrically shaped housing portion supporting said cutting element in such manner that a portion of the cutting edge extends beneath one surface of said workpiece and engages said workpiece,
   means operatively located within said cylindrically shaped housing portion and being connected to said cutting element for heating said cutting element to a temperature for melting the portions of the foam plastic material contacted thereby to at least partially melt the foam plastic material,
   adjustment means for variably setting the depth of penetration of said element below the work surface of said workpiece and retaining said element in this position, said adjustment means comprising a slot formed in the cylindrically shaped housing portion and a member secured to said tubular section and extending outwardly of said housing portion through said slot,
   releasable locking means for retaining said cutting element at the depth of penetration set by said adjustment means, said releasable locking means comprising a threaded section on said last named member engagable with said slot,
   a plurality of legs extending forwardly of said housing portion and being located in spaced apart relationship around a forwardly projected end of said housing,
   a relatively transparent plate member operatively attached to said legs and extending generally normal to said cutting element for providing a workpiece engaging surface in juxtaposition to and adapted to move easily over said workpiece surface, said plate member having an aperture therein through which the cutting element extends, and
   said cutting element being thin and generally U-shaped in order to extend below the surface of the workpiece to enable the material from the design which has been cut to be removed as a unitary member.

5. The device of claim 4 wherein said heating means causes heating of the cutting element to about 300°F.

* * * * *